US007587466B2

(12) United States Patent (10) Patent No.: US 7,587,466 B2
Yamada et al. (45) Date of Patent: Sep. 8, 2009

(54) METHOD AND COMPUTER SYSTEM FOR INFORMATION NOTIFICATION

(75) Inventors: Masahiro Yamada, Yokohama (JP); Toshihiko Fukuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 586 days.

(21) Appl. No.: 11/340,970

(22) Filed: Jan. 27, 2006

(65) Prior Publication Data
US 2007/0118605 A1 May 24, 2007

(30) Foreign Application Priority Data
Nov. 24, 2005 (JP) ............................. 2005-338613

(51) Int. Cl.
*G06F 15/167* (2006.01)
*G06F 15/16* (2006.01)
*G06F 3/06* (2006.01)

(52) U.S. Cl. ..................... 709/213; 709/214; 709/217; 709/245; 709/219

(58) Field of Classification Search ................. 709/213, 709/214, 216, 217, 219, 245
See application file for complete search history.

(56) References Cited

U.S. PATENT DOCUMENTS

| 7,299,266 B2* | 11/2007 | Boyd et al. ................. 709/213 |
| 2002/0143888 A1* | 10/2002 | Lisiecki et al. .............. 709/214 |
| 2002/0161850 A1* | 10/2002 | Ulrich et al. ................ 709/214 |
| 2003/0236850 A1* | 12/2003 | Kodama ..................... 709/214 |
| 2004/0024838 A1* | 2/2004 | Cochran ..................... 709/214 |
| 2005/0193085 A1* | 9/2005 | Shimizu ..................... 709/216 |

FOREIGN PATENT DOCUMENTS

| JP | 11175260 A | * | 7/1999 |
| JP | 2005-115898 | | 4/2005 |

OTHER PUBLICATIONS

Sobe, Peter. Reconfiguration of RAID-like Data Layouts in Distributed Storage Systems. Proceedings of the 18th International Parallel and Distributed Processing Symposium (IPDPS'04). University of Lubeck, Germany. 2004.*
Sobe, P., "Reconfiguration of RAID-like data layouts in distributed storage systems," Parallel and Distributed Processing Symposium, 2004. Proceedings. 18th International, vol., no., pp. 212-, Apr. 26-30, 2004.*

* cited by examiner

*Primary Examiner*—Wing F Chan
*Assistant Examiner*—Kostas Katsikis
(74) *Attorney, Agent, or Firm*—Townsend and Townsend and Crew LLP

(57) ABSTRACT

The present invention allows notification of information held by a first computer to a second computer even if the first computer and the second computer are not communicably connected. The first server 1 sends information which is used when the second server ii backs up (hereafter called catalog information) to the first storage system 21. The first storage system 21 converts the received catalog information into an electronic file having a predetermined file name and writes it to the PVOL 45, and writes the data group including the catalog information in the PVOL 45 to the SVOL 145 in the second storage system 121. The second server II acquires the catalog information from the SVOL 145 by searching the predetermined file name in the SVOL 145, and backs up the data in the SVOL 145 using the acquired catalog information.

7 Claims, 9 Drawing Sheets

FIG. 3A

| L-Seq# | L-LDEV# | P/S | FUNC | R-Seq# | R-LDEV# | STATUS | TIME | DBMS | INST | DB | PP/WWN |
|---|---|---|---|---|---|---|---|---|---|---|---|
| P1 | 1 | - | - | - | - | SMPL | - | - | - | - | - |
| P1 | 2 | P | S1 | S2 | 1 | PSUS | 2005/08/23 00:00 | SQL | DEFAULT | DB1 | AAA/WWN1 |
| P1 | 3 | P | TC | S1 | 5 | PAIR | 2005/08/24 00:00 | SQL | DEFAULT | DB1 | AAA/WWN2 |
| .. | .. | .. | .. | .. | .. | .. | .. | .. | .. | .. | .. |

| L-Seq# | L-LDEV# | P/S | FUNC | R-Seq# | R-LDEV# | STATUS | TIME | DBMS | INST | DB | PP/WWN |
|---|---|---|---|---|---|---|---|---|---|---|---|
| .. | .. | .. | .. | .. | .. | .. | .. | .. | .. | .. | .. |
| S1 | 5 | S | TC | P1 | 3 | PAIR | 2005/08/24 00:00 | SQL | DEFAULT | DB1 | AAA/WWN2 |
| .. | .. | .. | .. | .. | .. | .. | .. | .. | .. | .. | .. |

| L-Seq# | L-LDEV# | R-Seq# | R-LDEV# |
|---|---|---|---|
| P1 | 4 | S1 | 12 |

61

METHOD AND COMPUTER SYSTEM FOR INFORMATION NOTIFICATION

CROSS-REFERENCE TO PRIOR APPLICATION

This application relates to and claims priority from Japanese Patent Application No. 2005-338613, filed on Nov. 24, 2005 the entire disclosure of which is incorporated herein by reference.

BACKGROUND OF THE INVENTION

1. Field of the Invention

The present invention relates to a computer technology for notifying electronic information.

2. Description of the Related Art

A technology disclosed in Japanese patent Application Laid-Open No. 2005-115898, for example, is known in this field. According to this technology, the information processor generates a first data including a first instruction to be executed in a second storage device, and sends a request to write the first data to a first storage volume to a first write request section of a first storage device according to a first communication protocol. If the first data written in the first storage volume is an instruction to the second storage device, the first storage device sends a request to write the first data to a second storage volume to a second write request section of the second storage device according to a second communication protocol. The second storage device executes the first instruction which is set in the first data written in the second storage volume.

SUMMARY OF THE INVENTION

If a first computer and a second computer are communicably connected, for example, the first computer may notify information to the second computer on occasion. In this case, if the communication between the first computer and the second computer is cut off, information held by the first computer cannot be notified to the second computer.

With the foregoing in view, it is an object of the present invention to notify information held by the first computer to the second computer even if the first computer and the second computer are not communicably connected.

Other objects of the present invention shall be clarified in the description herein below.

The information notification method according to the first aspect of the present invention is as follows.

This method is a method for information notification to be implemented in a computer system wherein a first computer and a first storage system are communicably connected, the first storage system and a second storage system are communicably connected, the second storage system and a second computer are communicably connected, the first storage system comprises a first controller and a plurality of first storage devices, and the second storage system comprises a second controller and a plurality of second storage devices. The first computer sends information for the second computer (e.g. later mentioned catalog information), which is information to be referred to so that the second computer can perform specific processing appropriately, to the first storage system. The first controller writes the information for the second computer received from the first computer to certain first storage device out of the plurality of first storage devices, and sends the information for the second computer to the second storage system. The second controller writes the information for the second computer received from the first storage system to a certain second storage device out of the plurality of second storage devices, and sends the information for the second computer to the second computer. And the second computer receives the information for the second computer from the second storage system, and executes the specific processing by referring to the received information for the second computer.

Each computer may be a server machine, for example, or may be another computer.

Each storage system can be a disk array device comprising a plurality of arrayed storage devices, for example.

According to a first aspect of this method for information notification, the certain first storage device is a first command device capable of storing a command for the first controller. The certain second storage device is a second command device capable of storing a command for the second controller. The first computer sends a command to the first controller. The first controller writes a command received from the first computer to the certain first command device, reads and processes a command stored in the first command device, and if the information for the second computer is received from the first computer, writes the received information for the second computer to the first command device, and sends the information for the second computer written in the first command device to the second controller. The second controller writes the information for the second computer received from the first controller to the second command device, and sends the information for the second computer from the second command device to the second computer.

According to a second aspect of this method for information notification, in the above mentioned first aspect, the second computer has a storage area capable of storing a plurality of computer programs and a CPU capable of reading and executing each computer program from the storage area. The plurality of computer programs include first and second computer programs which can refer to the information for the second computer by being executed by the CPU, and a third computer program which receives the information for the second computer from the second command device by being executed by the CPU. Both of the first and second computer programs, by being executed by the CPU, receive the information for the second computer via the third computer program, and execute the specific processing using the received information for the second computer.

According to a third aspect of the method for information notification, in the above mentioned second aspect, (A) at least one of the first and second computer programs, by being executed by the CPU, requests the third computer program to acquire the information for the second computer, and (B) the third computer program, by being executed by the CPU, accesses the second command device according to the request, and the above (A) and (B) are repeated until at least one of the first and second computer programs acquires the information for the second computer.

According to a fourth aspect of the method for information notification, in the above mentioned second aspect, the first computer sends a second computer ID, which is an ID of a notification destination computer of the information for the second computer, to the first controller along with the information for the second computer. The first controller writes a set of the information for the second computer and the second computer ID to the first command device, and sends the set to the second controller. And the second controller receives the set from the first controller and writes it to the second command device, determines a second computer to be a notification destination of the information for the second computer in the set from the second computer ID included in the set written in the second command device, and sends the information for the second computer in the set written in the second command device to the determined second computer.

According to a fifth aspect of the method for information notification, in the fourth aspect, the third computer program, by being executed by the CPU, returns a corresponding response to the second controller if the information for the second computer is received from the second controller, and does not return this response to the second controller if not. And the second controller sends the information for the second computer again if this response is not received.

According to a sixth aspect of the method for information notification, the plurality of first storage devices include one or more primary data devices, which are primary storage devices for storing data to be referred to by the first computer. The plurality of second storage devices include each secondary data device, which is each secondary storage device forming a pair with each primary data device. The first computer writes the information for the second computer to a certain primary data device. The first controller sends a data group, including the information for the second computer in the certain primary data device, to the second controller. The second controller writes the data group received from the first controller to a certain secondary data device forming a pair with the certain primary data device. And the second computer acquires the information for the second computer from the certain secondary data device.

According to a seventh aspect of the method for information notification, in the above mentioned sixth aspect, the first computer converts the information for the second computer into an electronic file having a predetermined file name, and writes the electronic file to the certain primary data device. And the second computer acquires the information for the second computer, which is the electronic file, by searching the predetermined file name in the certain secondary data device.

According to an eighth aspect of the method for information notification, the information for the second computer is information for guaranteeing the consistency of the data in the first storage device to be referred to by the first computer.

According to a ninth aspect of the method for information notification, in the above mentioned eighth aspect, the plurality of first storage devices include one or more primary data devices, which are primary storage devices for storing data to be referred to by the first computer, and a first command device capable of storing a command for the first controller. The plurality of second storage devices include each secondary data device, which is each secondary storage device forming a pair with each primary data device, and a second command device capable of storing a command for the second controller. The first command device is provided with a first management table for recording pair information to indicate which primary data device and which secondary data device form a pair. The second command device is provided with a second management table for recording pair information to indicate which primary data device and which secondary data device form a pair. The first computer has a storage area capable of storing a plurality of computer programs, and a CPU capable of reading and executing each computer program from the storage area. The plurality of computer programs of the first computer include a first backup program for controlling backup of data, an access program for reading data from the primary data device and writing data to the primary data device, and a first copy control program for controlling data copy from the primary data device to the secondary data device. The second computer has a storage area capable of storing a plurality of computer programs and a CPU capable of reading and executing each computer program from the storage area. The plurality of computer programs of the second computer include a second backup program for controlling backup of data and a second copy control program for controlling data copy from the primary data device to the second data device. The first backup program, by being executed by the CPU, controls the access program so that the access program does not write data to a certain primary data device, prepares information for the second computer which includes information on the time when the control is performed, information on a pair of the certain primary data device and the certain secondary data device, and information on the access program, and sends an instruction to write the prepared information for the second computer to the first management table and to copy the data in the certain primary data device, to the first copy control program. The first copy control program, by being executed by the CPU, causes the first controller to write the prepared information for the second computer to the first management table, and to copy the data in the certain primary data device to the certain secondary data device. The first controller writes the information for the second computer from the first copy control program to the first management table, sends the information for the second computer written in the first management table to the second controller, and sends the data group in the certain primary data device to the second controller. The second controller writes the information for the second computer from the first controller to the second management table, and writes the data group from the first controller to the certain secondary data device. The second copy control program, by being executed by the CPU, receives the information for the second computer from the second management table, and transfers the received information for the second computer to the second backup program. And the second backup program, by being executed by the CPU, performs backup or recovery of the data group in the certain secondary data device using the information for the second computer from the second copy control program.

According to a tenth aspect of the method for information notification, in the above mentioned eighth aspect, the plurality of first storage devices include one or more primary data devices, which are primary storage devices for storing data to be referred to by the first computer. The plurality of second storage devices include each secondary data device, which is each secondary storage device forming a pair with each primary data device. The first computer has a storage area capable of storing a plurality of computer programs, and a CPU capable of reading and executing each computer program from the storage area. The plurality of computer programs of the first computer include a first backup program for controlling backup of data, an access program for reading data from the primary data device and writing data to the primary data device, and a first copy control program for controlling data copy from the primary data device to the secondary data device. The second computer has a storage area capable of storing a plurality of computer programs, and a CPU capable of reading and executing each computer program from the storage area. The plurality of computer programs of the second computer include a second backup program for controlling backup of the data, and a second copy control program for controlling data copy from the primary data device to the secondary data device. The first backup program, by being executed by the CPU, controls the access program so that the access programs does not write data to the certain primary data device, prepares information for the second computer, which includes information on the time when the control is performed, information on a pair of the certain primary data device and the certain secondary data device, and information on the access program, converts the prepared information for the second computer into an electronic file having a predetermined file name, and sends an instruction to write the electronic file to the certain primary data device, and to copy the data in the certain primary data device, to the first copy control program. The first copy control program, by being executed by the CPU, causes the first controller to copy the data in the certain primary data device to the certain secondary data device. The first controller sends a data group including the electronic file in the certain primary data device to the second controller. The second controller writes the data group from the first controller to the certain secondary data device. And the second backup program, by being executed by the CPU, acquires the information for the second computer, which is the electronic file, from the certain secondary data device by searching the predetermined file name in the certain secondary data device, and performs backup or recovery of the data group in the certain secondary data device using the acquired information for the second computer.

Each processing may be executed by each predetermined means. Each means may be each unit. Each means or unit may be implemented by hardware (e.g. circuit), computer program or a combination thereof (e.g. one or more CPUs reading a plurality of computer programs). Each computer program can be read from a storage resource (e.g. memory) provided to the computer. The storage resource may be installed via such a recording medium as a CD-ROM, or downloaded via a communication network, such as the Internet.

According to the present invention, information held by a first computer can be notified to a second computer, even if the first computer and the second computer are not communicably connected.

BRIEF DESCRIPTION OF THE DRAWINGS

FIG. 3A shows a configuration example of a first management table 47, FIG. 3B shows a configuration example of a second management table 147, and FIG. 3C shows a configuration example of the command device management table stored in the memory 26 of a first storage system 21;

DESCRIPTION OF THE PREFERRED EMBODIMENTS

Some embodiments of the present invention will now be described with reference to the drawings. In each of the following embodiments, it is assumed that the computer is a server.

Embodiment 1

Figure 1:
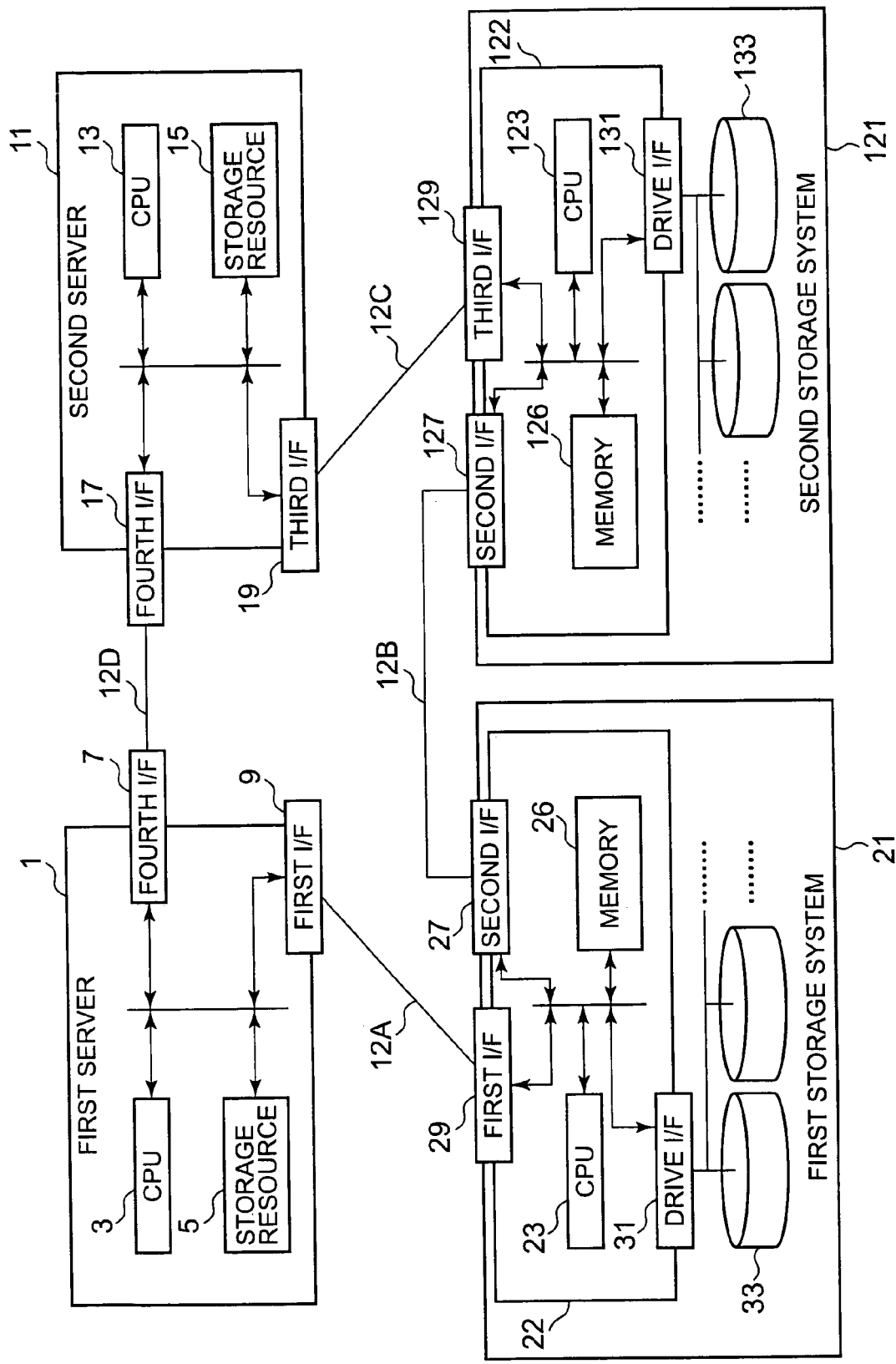
FIG. 1 is a diagram depicting an overview of the physical configuration of a computer system according to a first embodiment of the present invention.

FIG. 1 shows an overview of the physical configuration of the computer system according to the first embodiment of the present invention.

The first server 1 and the first storage system 21 are communicably connected via the first communication medium 12A. The first storage system 21 and the second storage system 121 are communicably connected via the second communication medium 12B. The second storage system 121 and the second server 11 are communicably connected via the third communication medium 12C. And the second server 11 and the first server 1 are communicably connected via the fourth communication medium 12D. Each communication medium 12A-12D can be a leased line or a communication network, for example. The communication network can be the Internet, a LAN (Local Area Network) or a SAN (Storage Area Network), for example. The communication medium 12A to 12C may be one communication network or may be separate communication networks. At least one of the communication medium 12A to 12C can be a medium that can perform communication conforming to the Fiber Channel protocol, for example. The communication medium 12D can be a medium that can perform communication conforming to TCP/IP, for example.

The first server 1 and the second server 11 can virtually have the same hardware configuration. So this hardware configuration example will be described using the first server 1 as an example. (In FIG. 1, in the first server 1 and the second server 11, virtually the same composing elements are denoted by the same reference numbers increased by ten.)

The first server 1 comprises a storage resource (e.g. memory, hard disk drive) 5 for storing various computer programs, a CPU 3 for reading and executing a computer program from the storage resource 5, a first I/F 9 to be a communication interface (hereafter I/F) of the first communication medium 12A, and a fourth I/F 7 to be the I/F of the fourth communication medium 12D. (The second server 11 may comprise the third I/F 19 to be the I/F of the third communication medium 12C, instead of the first I/F 9). For each I/F, a host bus adapter or a LAN controller, for example, can be used.

The first storage system 21 and the second storage system 121 can virtually have the same hardware configuration. So this hardware configuration example will be described using the first storage system 21 as an example. (In FIG. 1, in the first storage system 21 and the second storage system 121, virtually the same composing elements are denoted by the same reference numbers increased by one hundred.)

The first storage system 21 can be a RAID (Redundant Array of Independent Inexpensive Disks) system comprising a plurality of media drives 33, for example. Each media drive 33 comprises a storage medium (e.g. such a disk as a hard disk and DVD) for storing data. The first storage system 21 can further comprise a first controller 22, in addition to the plurality of media drives 33.

The first controller 22 is a device for controlling operation of the first storage system 21. The first controller 22 can comprise a first I/F 29 to be the I/F of the first communication medium 12A, a second I/F 27 to be the I/F of the second communication medium 12B, and a drive I/F 31 for controlling communication via each media drive 33. (The second controller 122 can comprise a third I/F 129 to be the I/F of the third communication medium 12C instead of the first I/F 29.) The first controller 22 can also comprise a memory 26 and a CPU 23. The number of memories 26 and CPUs 23 may be one or plural. The memory 26 can have a cache area for temporarily storing data to be exchanged between the media drive 33 and the first server 1, and a control area for storing data and a computer program to control the first storage system 21, for example. The CPU 23 can read and execute a computer program from the control area.

The above mentioned configuration of each controller 22 and 122 are examples, and other configurations may be used. For example, at least one of the controllers 22 and 122 may comprise a plurality of first control sections (e.g. control circuit boards) for controlling communication with an external device (e.g. computer or another storage system), a plurality of second control sections (e.g. control circuit boards) for controlling communication with a media drive 33, a cache memory for the storing data to be exchanged between an external device and the media drive 33, a control memory for storing data for controlling the first storage system 21, each first control section, each second control section, and a connection section (e.g. such a switch as a crossbar switch) for connecting the cache memory and control memory. In this case, one of the first control section and the second control section, or both of them together can perform processing as a later mentioned controller.

The above is an example of a physical configuration of the computer system according to the first embodiment. In the first embodiment, even if the servers 1 and 11 cannot communicate via the fourth communication medium 12D (or even if the fourth communication medium 12D is not used), the information held by the first server 1 can be notified to the second server 11 via the first storage system 21 and the second storage system 121 by the following notification method. Now an example of the logical configuration to be constructed in the above mentioned computer system to implement the notification method will be described.

Figure 2:
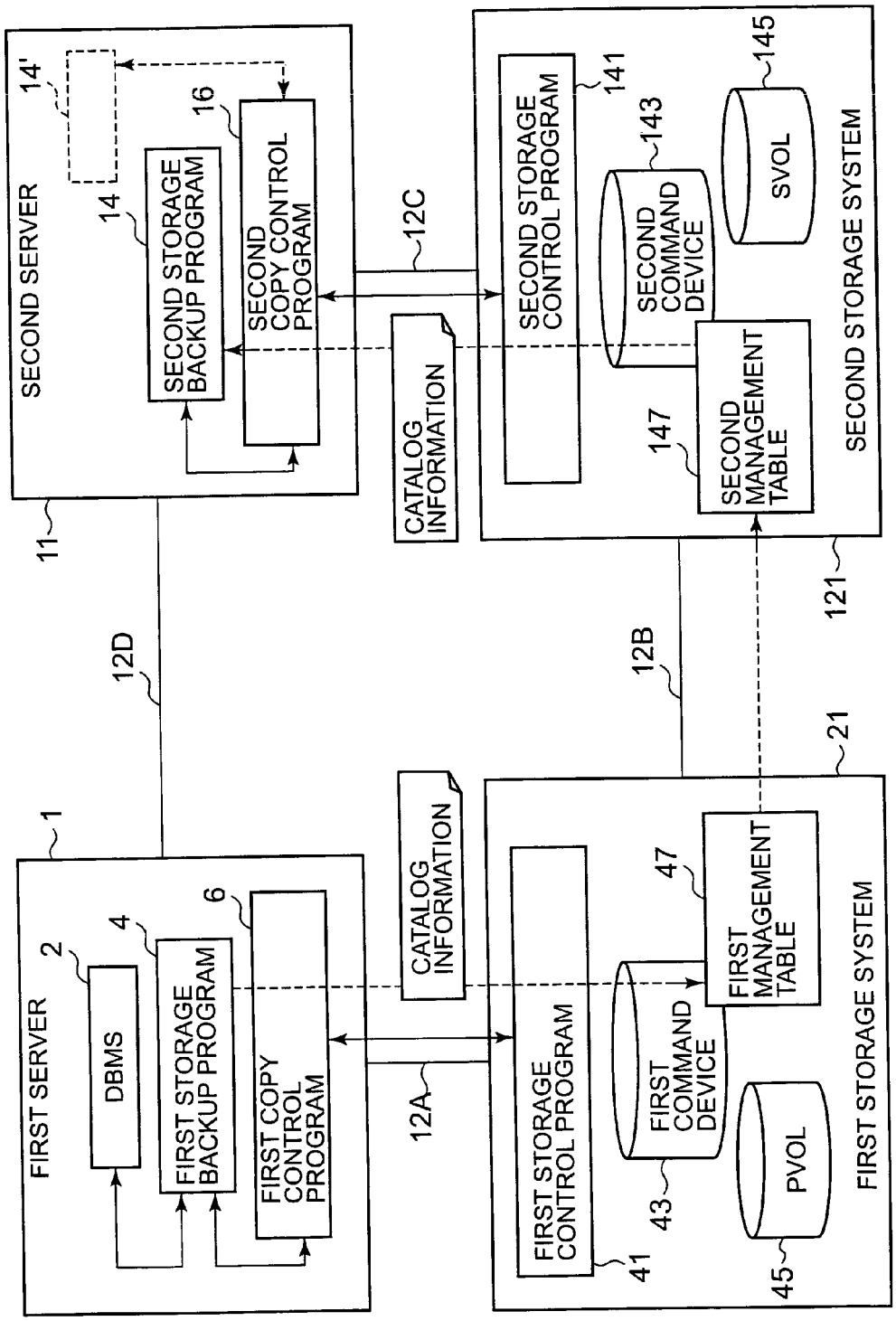
FIG. 2 is a diagram depicting an example of the logical configuration constructed in the computer system according to the first embodiment.

FIG. 2 shows an example of the logical configuration constructed in the computer system according to the first embodiment.

The first server 1 is a data base server, for example. The second server 11 is a backup server, for example. The storage resource 5 of the first server 1 and the storage resource 15 of the second server 11 store various computer programs. The computer programs to be stored in the storage resource 5 are, for example, such application programs as a data base management system (hereafter DBMS) 2, first storage backup program 4, and first copy control program 6. The computer programs to be stored in the storage resource 15 are, for example, the second storage backup program 14 and second copy control program 16. Processings which various computer programs can execute will be described later. It is the CPU that reads and executes various computer programs to perform specific processings, but to avoid redundant description, a simple expression, such as "computer program executes processing" will be used.

The memory 26 of the first storage system 21 stores the first storage control program 41. In the same way, the memory 126 of the second storage system 121 stores the second storage control program 141. Processings to be executed by these computer programs will also be described later.

In the physical storage areas of a plurality of media drives 33 of the first storage system 21, a plurality of logical volumes, which are logical storage devices, are installed. At least one of the plurality of logical volumes may be installed in the memory 26. The plurality of logical volumes include a data volume and a first command device 43. The data volume is a logical volume where the data used by an application program of the first server 1 is stored (hereafter called data volume), and specifically this is a primary logical volume (hereafter PVOL) 45 to be a copy source of the remote copy, for example. The first command device 43 stores all of the plurality of commands received by the first storage system 21, or a predetermined command (e.g. a command with a predetermined format different from a write request or read request to PVOL 45) out of these plurality of commands. The first command device 43 can have a first management table 47. The first management table 47 will be described later.

The second storage system 121 can comprise a plurality of logical volumes, lust like the first storage system 21. This plurality of logical volumes include a secondary logical volume (hereafter SVOL)m which is a kind of data volume, to be a copy destination of the remote copy, and a second command device 143 for storing all of the plurality of commands received by the second storage system 121 or a predetermined command out of these plurality of commands. The second command device 143 can have a second management table 147. The second management table 147 will be described later.

In the first embodiment, the catalog information required for backing up (and/or restoring) data used by the DBMS 2 of the first server 1 is output from the first server 1. The catalog information is written to the first management table 47 of the first command device 43. The catalog information written in the first management table 47 is read from the first management table 47. The catalog information which was read is sent from the first storage system 21 to the second storage system 121 via the second communication medium 12B. The catalog information received by the second storage system 121 is written to the second management table 147 of the second command device 143. The catalog information written in the second management table 147 is sent to the second server 11. The CPU 13 of the second server 11 writes the received catalog information to the storage resource 15, and executes backup or restore using the catalog information.

Now a configuration example of the first management table 47, a configuration example of the second management table 147, and a configuration example of the catalog information will be described.

FIG. 3A shows a configuration example of the first management table 47. FIG. 3B shows a configuration example of the second management table 147.

The first management table 47 records information on a volume pair to indicate which logical volume of the first storage system 21 and which logical volume of which storage system form a pair. In the same way, the second management table 147 records information on a volume pair to indicate which logical volume of the second storage system 121 and which logical volume of which storage system form a pair.

Specifically, for example, each of the first management table 47 and the second management table 147 stores hardware information, DBMS information, storage backup program information, and notification destination server information for each data volume of the first or second storage system 21 or 121 having the table 47 or 147. The information elements of the hardware information are, for example, the storage system identification number (L-Seq #), volume number (L-LDEV #), volume attribute (primary or secondary (P/S)), copy type (e.g. synchronous remote copy or asynchronous remote copy (FUNC)), identification number of another storage system where a pair partner logical volume exists (R-Seq #), the pair partner logical volume number (R-LDEV #), pair status (STATUS), and DBMS staticization time (TIME). The information elements of DBMS information are, for example, the DBMS identifier (DBMS), AP instance name (INST), and AP data base name (DB). An example of the information elements of the storage backup program information is the program identifier (PP) An example of the information elements of the notification destination server information is the ID of the server to be the notification destination of the catalog information, such as the World Wide Name (WWN). The volume copy time may be recorded, although this is not shown in FIG. 3A and FIG. 3B. The volume copy time may be at least one of the time when copy processing started, the time when copy processing ended, and the time length required for copy processing, for example.

The catalog information is information required for guaranteeing consistency of the data used for DBMS 2. The catalog information includes, for example, the hardware information and DBMS information out of the information group recorded in the above mentioned tables 47 and 147.

In the present embodiment, the catalog information sent from the first server 1 is sent to the second server 11 via the first command device 43 and the second command device 143, but in this case the table for managing information on the command devices (hereafter command device management table) is recorded in the memory 26 and 126 of each storage system 21 and 121.

FIG. 3C shows a configuration example of the command device management table stored in the memory 26 of the first storage system 21. (The configuration of the command device management table stored in the memory 126 of the second storage system 121 is virtually the same.)

In the command device management table 61, the storage system identification number (L-Seq #) of the first storage system 21, the volume number (L-LDEV #) of the first command device 43, the identification number (R-Seq #) of the second storage system where the second command device 143, which is a pair partner of the first command device 43, exists, and the volume number (R-LDEV #) of the second command device 143 are recorded.

Now an example of the copy processing executed in the first embodiment will be described.

The first storage control program 41 controls copy from PVOL 45 to SVOL 145 as follows. Specifically the first storage control program 41 sets the pair status (STATUS) of PVOL 45 and SVOL 145 to copy status (COPY), synchronous status (PAIR) and asynchronous status (PSUS), for example.

"Copy status" is a status where the difference between the data in PVOL 45 and the data in SVOL 145 (hereafter difference data) has been copied to SVOL 145 based on the bit map for managing the difference between PVOL 45 and SVOL 145 (e.g. bit map comprised of each bit corresponding to each location in PVOL, hereafter called difference bit map, which is not illustrated here) in the stage where the volume pair reaches "synchronous status". When the difference data becomes zero, the status of the volume pair automatically changes from "copy status" to "synchronous status".

"Synchronous status" is a status where the data of PVOL 45 and that of SVOL 145 are synchronized. In this status, if the data of PVOL 45 is updated, the update (data newly written in PVOL 45) is immediately (e.g. virtually at the same time as the update of PVOL 45) written to SVOL 145.

"Asynchronous status" is a status where the data of PVOL 45 and that of SVOL 145 are asynchronous, and an update of the data in PVOL 45 does not influence the data of SVOL 145. (In other words, even if new data is written in PVOL 45, that data is not written to SVOL 145.) If new data is written in PVOL 45 in this status, the data is stored in a predetermined storage area by the first storage control program 41 as the difference data, and the bit map records that an update occurred at a location where the new data was written (e.g. bit corresponding to the location changes from 0 to 1).

In order to synchronize the data of PVOL 45 and that of SVOL 145, the first storage control program 41 specifies the difference data which must be copied from PVOL 45 to SVOL 145 based on the difference bit map at the point when a predetermined instruction (e.g. snapshot acquisition instruction) from the first copy control program 6, and changes the status of the volume pair to "copy status".

The first storage control program 41 also executes copy of the specified difference data in bit map units, and updates the corresponding location on the difference bit map after data copy (e.g. at completion of copy of the difference data, corresponding bit is changed from 1 to 0). The first storage control program 41 can repeat this processing until the difference data becomes zero. At the point when the difference in bit maps becomes zero, the status of the volume pair automatically changes to "synchronous status".

After copy of the difference data completes, the first storage control program 41 can change the status of the volume pair to "asynchronous status" in order to create a snapshot (that is, in order not to reflect the update of PVOL 45 to SVOL 145).

When a predetermined inquiry is received from the first copy control program 6, the first storage control program 41 can report the pair status. By this series of processing, the first storage control program 41 can generate a snapshot of PVOL 45, at the point when a predetermined instruction (e.g. snapshot acquisition instruction) is received, in SVOL 145.

Now the flow of transmission of the catalog information from the first server 1 to the second server 11 when the above copy processing is performed will be described.

Figure 4:
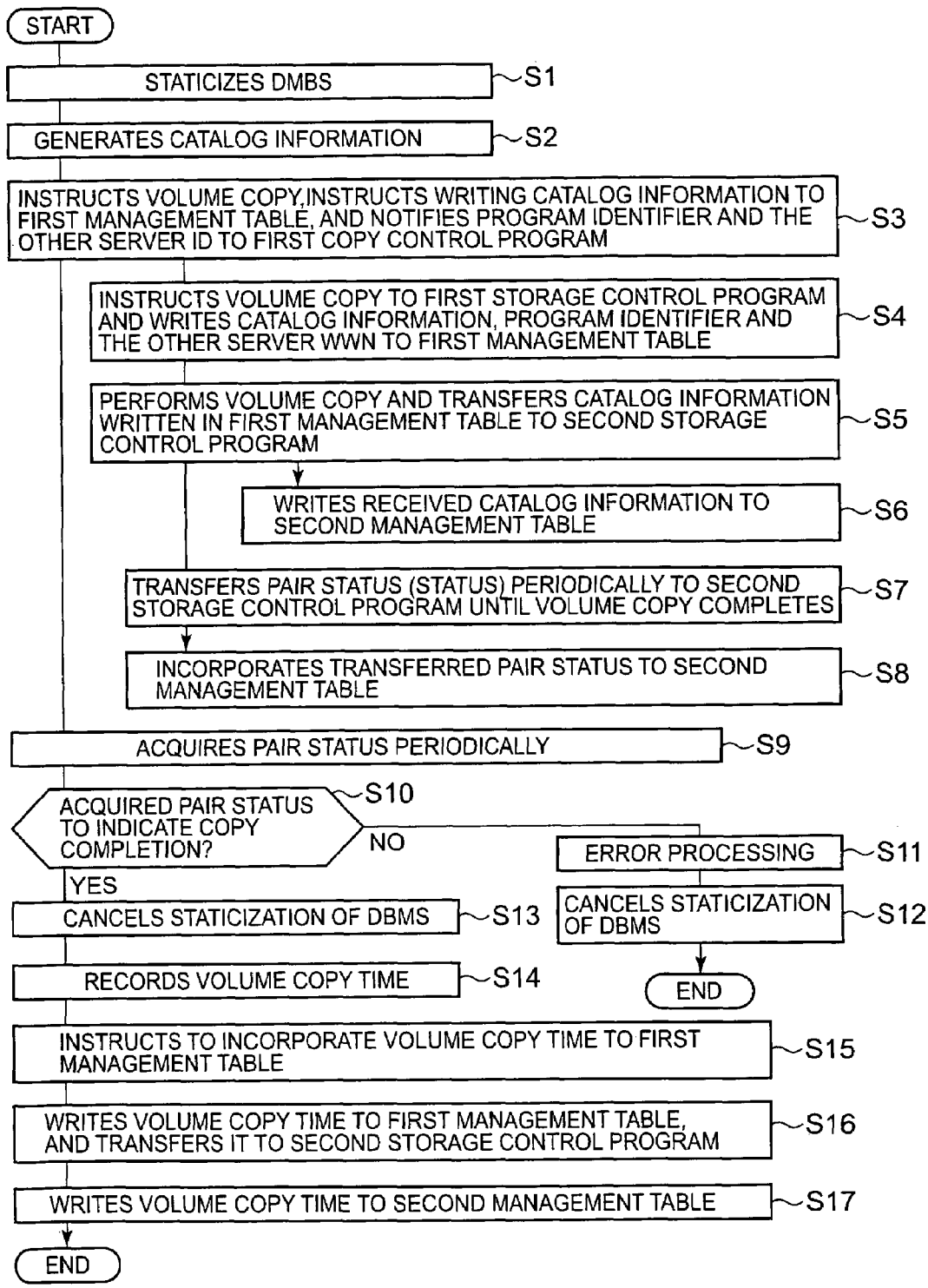
FIG. 4 is a flow chart depicting an example of processing until the update of the second management table 147 completes in the case when the catalog information is sent from a first server 1.

FIG. 4 shows an example of the processing flow to be performed up to the completion of the update of the second management table 147 when catalog information is sent from the first server 1.

The first storage backup program 4 staticizes the DBMS 2 when a predetermined event is generated (step S1). A "predetermined event" in this case is an event for acquiring a snapshot of PVOL 45, for example, and specifically the input of a snapshot acquisition instruction to the first server 1, or the detection of a predetermined time, for example. "Staticization of the DBMS 2" refers to the DBMS 2 not writing new data to PVOL 45, for example. In staticized status, the DBMS 2 cannot write new data to PVOL 45. In other words, an exchange of data between the DBMS 2 and PVOL 45 is performed via the first copy control program 6; staticizing DBMS 2 disables such an exchange.

Then the first storage backup program 4 generates catalog information, and writes it to the storage resource 5 (S2). Here the first storage backup program 4 generates the hardware information including the time when DBMS 2 was staticized in step S1, and the DBMS information of the DBMS 2.

Then the first storage backup program 4 performs the processing in step S3. In other words, the first storage backup program 4 sends the instruction of the volume copy to the first copy control program 6. Also the first storage backup program 4 sends an instruction to write the catalog information generated in step S2 to the first management table 47, and the notification of the program identifier and the other server WWN to the first copy control program 6. Here "volume copy instruction" includes L-Seq #, L-LDEV #, R-Seq # and R-LDEV #, for example. The program identifier can be the identifier of the first storage backup program 4, for example. The other server WWN can be the WWN of the second server 11.

Then step S4 and step S9 are performed.

In step S4 the first copy control program 6 receives an instruction from the first storage backup program 4, and responding to the instruction, sends a volume copy instruction to the first storage control program 41. Specifically the first copy control program 6 writes the volume copy instruction to the command area (e.g. an area different from the storage area where the first management table 47 exists) of the first command device 43, for example. The volume copy instruction includes L-Seq #, L-LDEV #, R-Seq # and R-LDEV #, for example.

In step S4, the first copy control program 6 writes the catalog information (specifically various information elements included therein) from the first storage backup program 4 and the program identifier and the other server WWN notified by the first storage backup program 4 in the open record or predetermined record of the first management table 47. Specifically the first copy control program 6 can write a command to write the catalog information, the program identifier and the other server WWN to the first management table 47 (hereafter catalog write command) in the command area of the first command device 43. In this case, when the first storage control program 41 reads the catalog write command from the command area of the first command device 43, the first storage control program 41 writes the catalog information, program identifier and the other server WWN in the command to the first management table 47 according to the catalog write command.

In step S5, the first storage control program 41 can execute copy processing according to the volume copy instruction from the first copy control program 6. Specifically the first storage control program 41 can judge the copy source PVOL 45 and the copy destination SVOL 145, from L-Seq #, L-LDEV #, R-Seq # and R-LDEV # in the volume copy instruction (e.g. volume copy instruction acquired from the first command device 43), for example. And by performing the above mentioned copy processing, the first storage control program 41 generates a snapshot of PVOL 45 at the point when the volume copy instruction was received, in SVOL 145. Specifically the first storage control program 41 sends a copy instruction, including the copy target data (e.g. above mentioned difference data), volume number of SVOL 145, and write destination LBA (Logical Block Address) in SVOL 145, to the second storage control program 141, for example. The second storage control program 141 writes the copy target data to the SVOL 145 according to the copy instruction.

In step S5, the first storage control program 41 transfers the catalog information, program identifier and the other server WWN written in the record of the first management table 47 to the second storage control program 141. This processing can be performed at the timing of the volume copy instruction from the first copy control program 6, for example. The second storage control program 141 writes the transferred catalog information, program identifier and the other server WWN to a predetermined record (e.g. record corresponding to the transfer source record) or an open record of the second management table 147 (S6). In step 5, the first storage control program 41 specifies a second command device 143 corresponding to the first command device 43 from the command device management table 61, and writes the catalog information transmission command to the second command device 143. The catalog information transmission command instructs the second storage control program 141 to send the catalog information to the second server 11 having the other server WWN. The catalog information transmission command may be written to the first command device 43 by the first server 1, and transferred from the first command device 43 to the second command device 143 by the first storage control program 41.

The first storage control program 41 can periodically transfer the pair status (STATUS) to the second storage control program 141 until the above mentioned copy processing ends (S7). The second storage control program 141 receives the pair status from the first storage control program 41, and updates the pair status on the record where the catalog information, etc. were written in step S6 to the received pair status (S8).

In step S9, the following is executed. For example, the first storage backup program 4 periodically inquires the pair status to the first copy control program 6. Responding to this, the first copy control program 6 inquires the pair status to the first storage control program 41. Responding to the inquiry, the first storage control program 41 replies with the pair status at the point when the inquiry was received to the first copy control program 6. Then the first copy control program 6 notifies the replied pair status to the first storage backup program 4.

If a pair status to indicate copy completion is not acquired after a predetermined time elapses, or if a pair status to indicate a copy failure is acquired in step S9 (NO in S10), the first storage backup program 4 executes predetermined error processing (S11), and cancels the staticization of the DBMS 2 (S12).

If a pair status to indicate copy completion (e.g. synchronous status that transited from copy status) is acquired in step S9 (YES in S10), the first storage backup program 4 cancels the staticization of the DBMS 2 (S13) The first storage backup program 4 records volume copy time (e.g. at least one of copy processing start time, copy processing end time and time length required for copy processing) in the catalog information written in the storage resource 5 (S14). Also the first storage backup program 4 instructs the first copy control program 6 to write the volume copy time to the first management table 47 (SIS). According to this instruction, the first copy control program 6 writes the volume copy time in the record where the catalog information, etc. was written in step S4 in the first management table 47, and the first storage control program 41 transfers the volume copy time written in the first management table 47 to the second storage control program 141 (S16). The second storage control program 141 receives the volume copy time, and writes the received volume copy time in the record where the catalog information, etc. was written in step S6 in the second management table 147 (S17). The volume copy time can be indicated by the second server 11, for example.

Figure 5A:
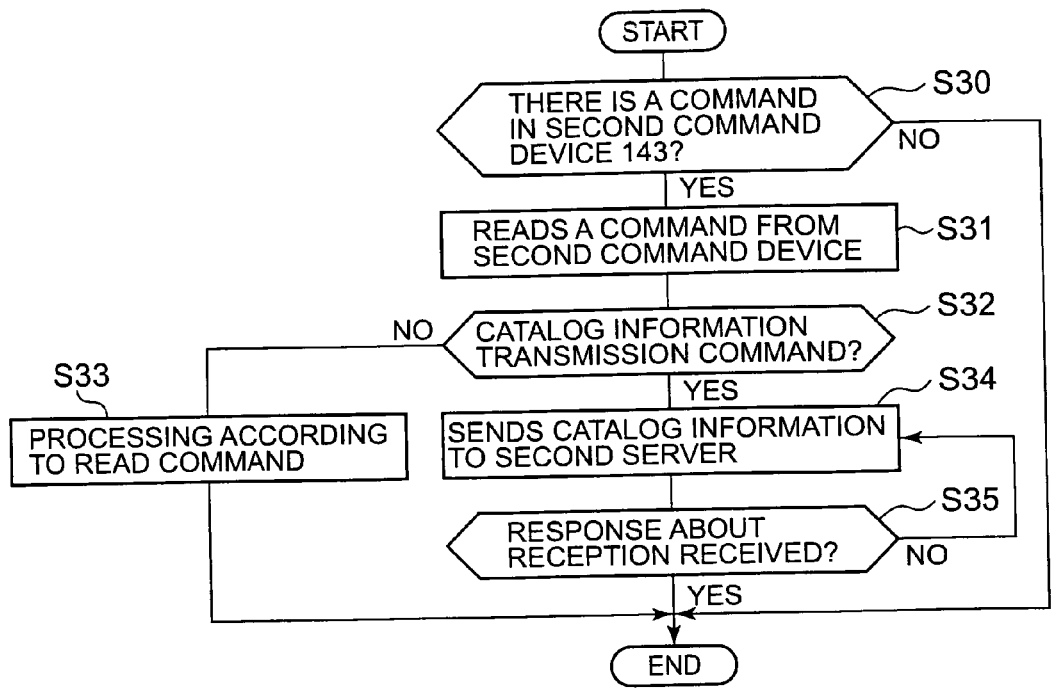
FIG. 5A is a flow chart depicting an example of processing executed by a second storage control program 141.

FIG. 5A shows an example of the processing flow executed by the second storage control program 141.

The processing shown in FIG. 5A can be started periodically. If a command is recorded in the command area of the second command device 143 (YES in S30), the second storage control program 141 reads the command from the command area (S31). If the read command is not the catalog information transmission command (NO is S32), the second storage control program 141 executes processing according to the read command (S33). If the read command is the catalog information transmission command (YES in S32), the second storage control program 141 acquires the catalog information written in step S8 from the second management table 147 according to the command (e.g. command in which the record where the catalog information, etc. is written is specified), and sends the acquired catalog information to the second server 11 having the other server WWN written in the record of the acquisition source from which the catalog information was acquired (S34). In this case, if the response on the reception of the catalog information is received from the second copy control program 16 which receives the catalog information (YES in S35), the second storage control program 141 ends the processing, but if this response is not received (NO in S35), the second storage control program 141 can retry the transmission of the catalog information.

The above is the description on the first embodiment. The catalog information may be written to the second management table 147 by sending a write instruction from the first storage control program 41 to the second storage control program 141, or by sending a read instruction from the second storage control program 141 to the first storage control program 41. The catalog information sent from the second storage system 121 to the second server 11 is provided to the second storage backup program 14 via the second copy control program 16. The second storage backup program 14 can execute backup or restore using the received catalog information. When backup is executed, the second storage backup program 14 reads data from the SVOL 145 which is specified based on the received catalog information, and writes the data to the storage resource 15 or a storage device communicably connected to the second server 11 (hereafter secondary storage device), which is not illustrated. When restore is executed, the second storage backup program 14 reads the data held as backup from the storage resource 15 or the above mentioned secondary storage device (e.g. a storage device having a magnetic tape), and writes the read data to the SVOL 145 which is specified based on the received catalog information. In this case, the second storage control program 141 writes the data in the SVOL 145 to PVOL 45 (specifically attributes of the logical volumes 145 and 45 are inverted so that 45 becomes SVOL and 145 becomes PVOL, and data is copied from PVOL 145 to SVOL 45, for example). By this, the data can be restored in the logical volume 45.

According to the above mentioned first embodiment, the catalog information sent from the first server 1 can be provided to the second server 11 via the first command device 43 and the second command device 143. By this, the catalog information held by the first server 1 can be provided to the second server 11, even if the first server 1 and the second server 11 are not communicably connected.

According to the first embodiment, the second copy control program 16 receives the catalog information and the catalog information is provided from the second copy control program 16 to the second storage backup program 14. By this, if a different type of storage backup program 14' is installed in the second server 11, the second copy control program 16 can be a common interface for the second storage control program 141 of each storage backup program, as shown in the dotted line in FIG. 2, so a different type of storage backup program 14' can receive the catalog information.

In the first embodiment, the second storage system 121 provides the catalog information written in the second management table 147 to the second server 11, without receiving a request from the second server 11, but the second server 11 may acquire the catalog information from the second management table 147 as a variant form. Now this variant form will be described.

Figure 5B:
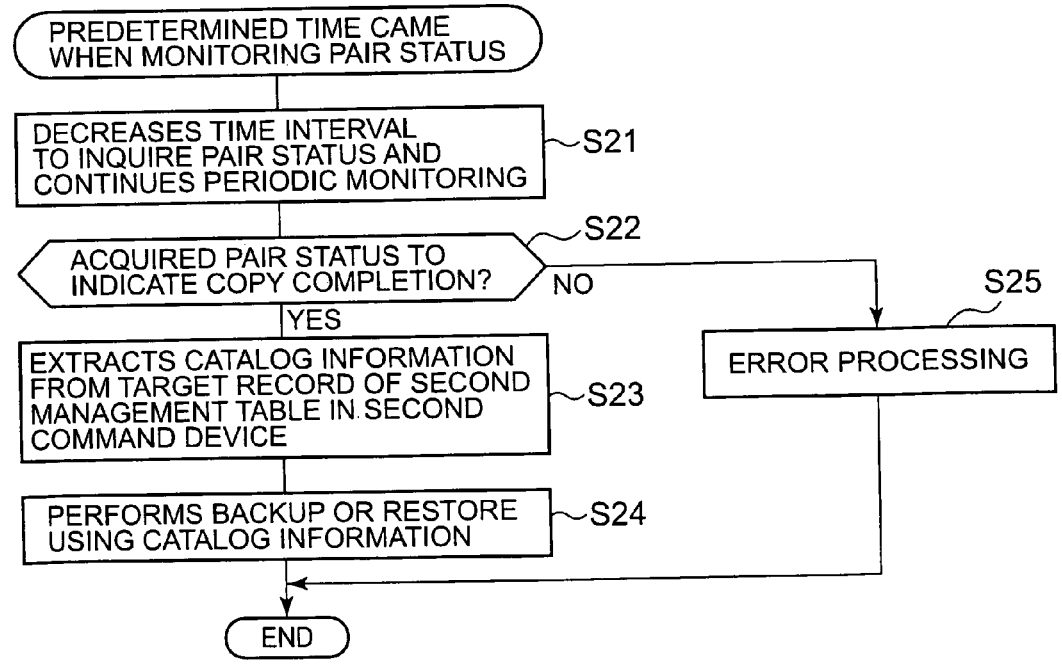
FIG. 5B is a flow chart depicting an example of processing executed by a second server 11 in a variant form of the first embodiment of the present invention.

FIG. 5B shows an example of the processing flow executed by the second server 11 according to the variant form of the first embodiment of the present invention.

The second storage backup program 14 has a periodic monitoring function. The periodic monitoring function is a function to inquire the pair status to the second copy control program 16 periodically.

If a predetermined time (e.g. backup time defined in the schedule input by the user) comes when the periodic monitoring is performed, the second storage backup program 14 decreases the time interval to inquire the pair status, so as to continue periodic monitoring (S21). Responding to the inquiry from the second storage backup program 14, the second copy control program 16 inquires the pair status to the second storage control program 141. Responding to this inquiry, the second storage control program 141 replies the pair status from the first storage control program 41 to the second copy control program 16. The second copy control program 16 notifies the replied pair status to the second storage backup program 14.

When the second storage backup program 14 does not acquire a pair status to indicate copy completion even if a certain time has elapsed since the above mentioned predetermined time, or the second storage backup program 14 acquired a pair status to indicate copy failure (NO in S22), the second storage backup program 14 executes a predetermined error processing (S25). If the pair status to indicate copy completion is acquired (YES in S22), the second storage backup program 14 acquires catalog information from the target record of the second management table 147 (S23), and performs backup or restore using the acquired catalog information (S24). Here "target record" may be a predetermined record, or a record matching predetermined conditions found in the record groups in the second management table 147.

In this variant form as well, effects the same as the first embodiment can be implemented. In this variant form, the other server WWN and the catalog information transmission command are unnecessary.

Embodiment 2

Now the second embodiment of the present invention will be described. Differences from the first embodiment will primarily be described, and description will be simplified or omitted for the common aspects with the first embodiment.

Figure 6:
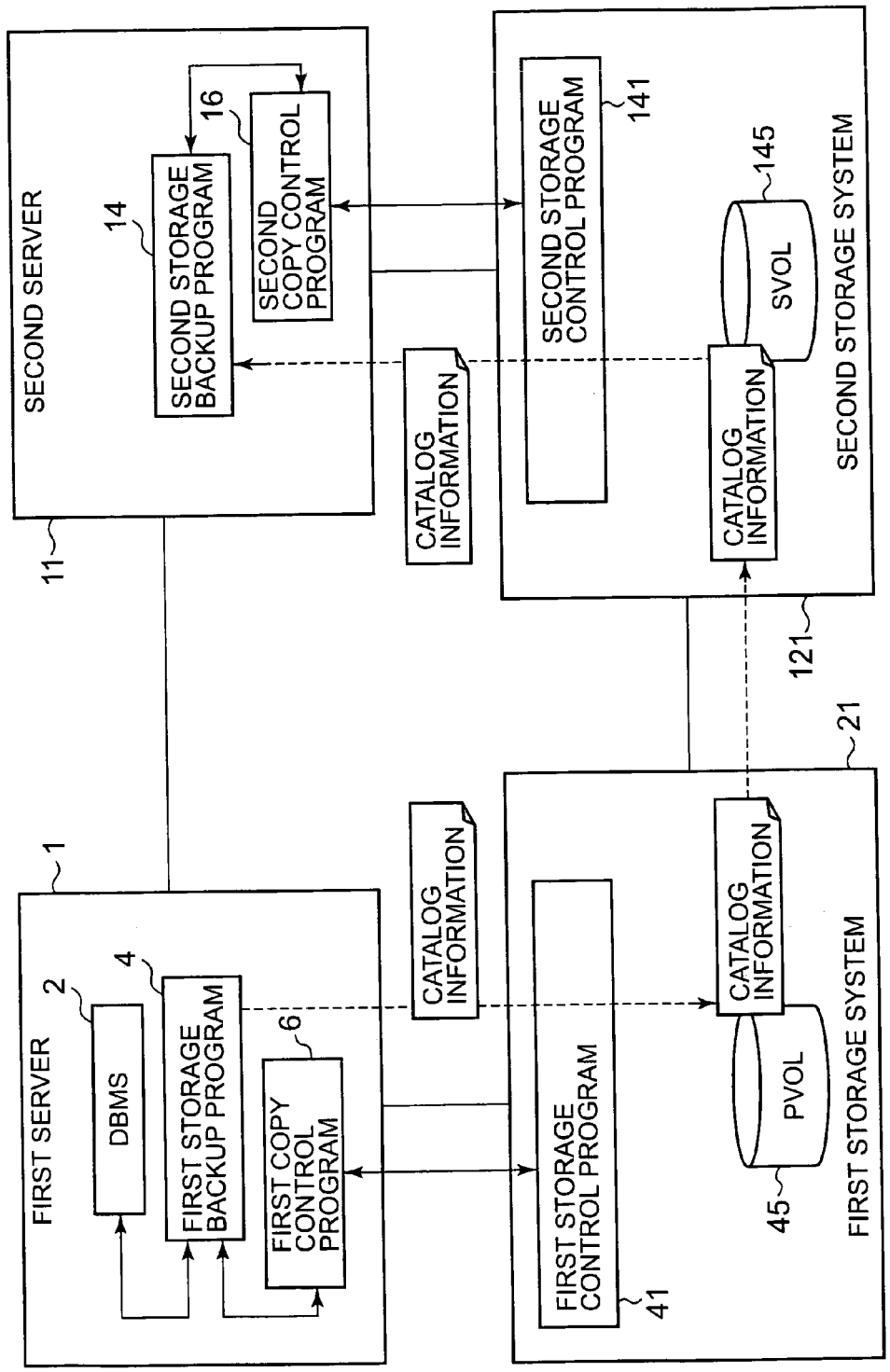
FIG. 6 is a diagram depicting an example of the logical configuration constructed in the computer system according to the second embodiment of the present invention.

FIG. 6 shows an example of the logical configuration constructed in the computer system according to the second embodiment of the present invention.

In the second embodiment, the above mentioned command devices 43 and 143 are not installed in each storage system 21 and 121. Therefore each management table 47 and 147 is not in each storage system 21 and 121.

In the second embodiment, the first storage backup program 4 can write the catalog information to PVOL 45 along with the data. Therefore if data is copied from PVOL 45 to SVOL 145, the catalog information is also copied to SVOL 145. The second storage backup program 14 can acquire the catalog information when data is read from SVOL 145.

Figure 7:
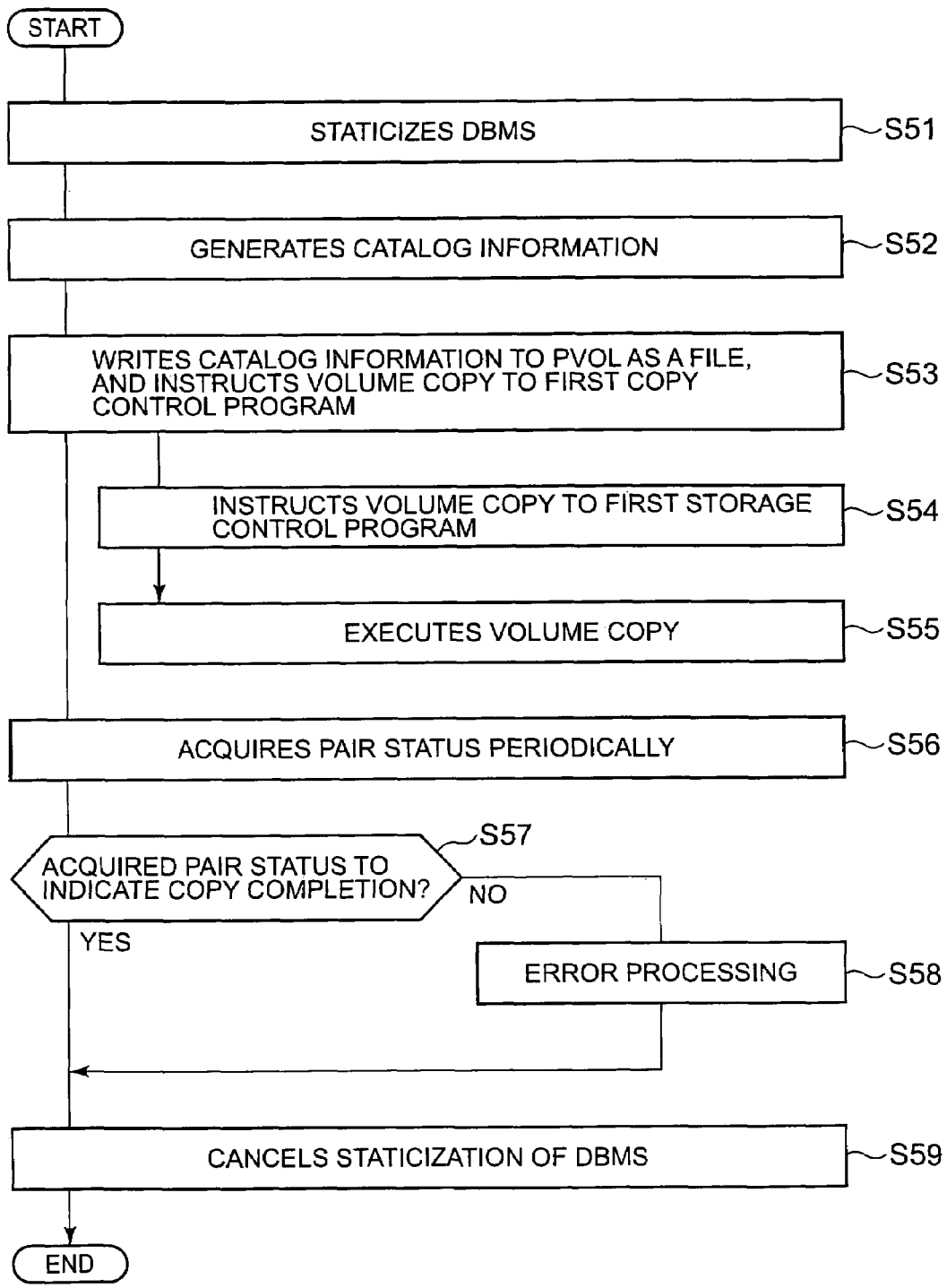
FIG. 7 is a flow chart depicting an example of processing executed by the first server 1 and the first storage system 21 in the second embodiment of the present invention.

FIG. 7 shows an example of the processing flow executed in the first server 1 and the first storage system 21 according to the second embodiment.

The first storage backup program 4 staticizes the DBMS 2, just like steps S1 and S2 in the first embodiment, and generates the catalog information (S51, S52).

The first storage backup program 4 converts the generated catalog information into a file and writes it to PVOL 45, and sends the volume copy instruction to the first copy control program 6 (S53). Here the catalog information is an electronic file, and the file name thereof is a predetermined file name.

The first copy control program 6 sends the volume copy instruction to the first storage control program 41 (S54). The first storage control program 41 performs copy processing, just like step S5 (S55).

After S53, just like step S9, the pair status is periodically acquired (S56). If a pair status to indicate copy completion is acquired (YES in S57), the first storage backup program 4 cancels the staticization of the DBMS 2 (S59). In a case which is the same as the case of NO in step S10 (NO in S57), on the other hand, the first storage backup program 4 executes a predetermined error processing (S58), then cancels the staticization of the DBMS 2 (S59).

In the above flow, the first storage control program 41 periodically notifies the pair status to the second storage control program 141.

Figure 8:
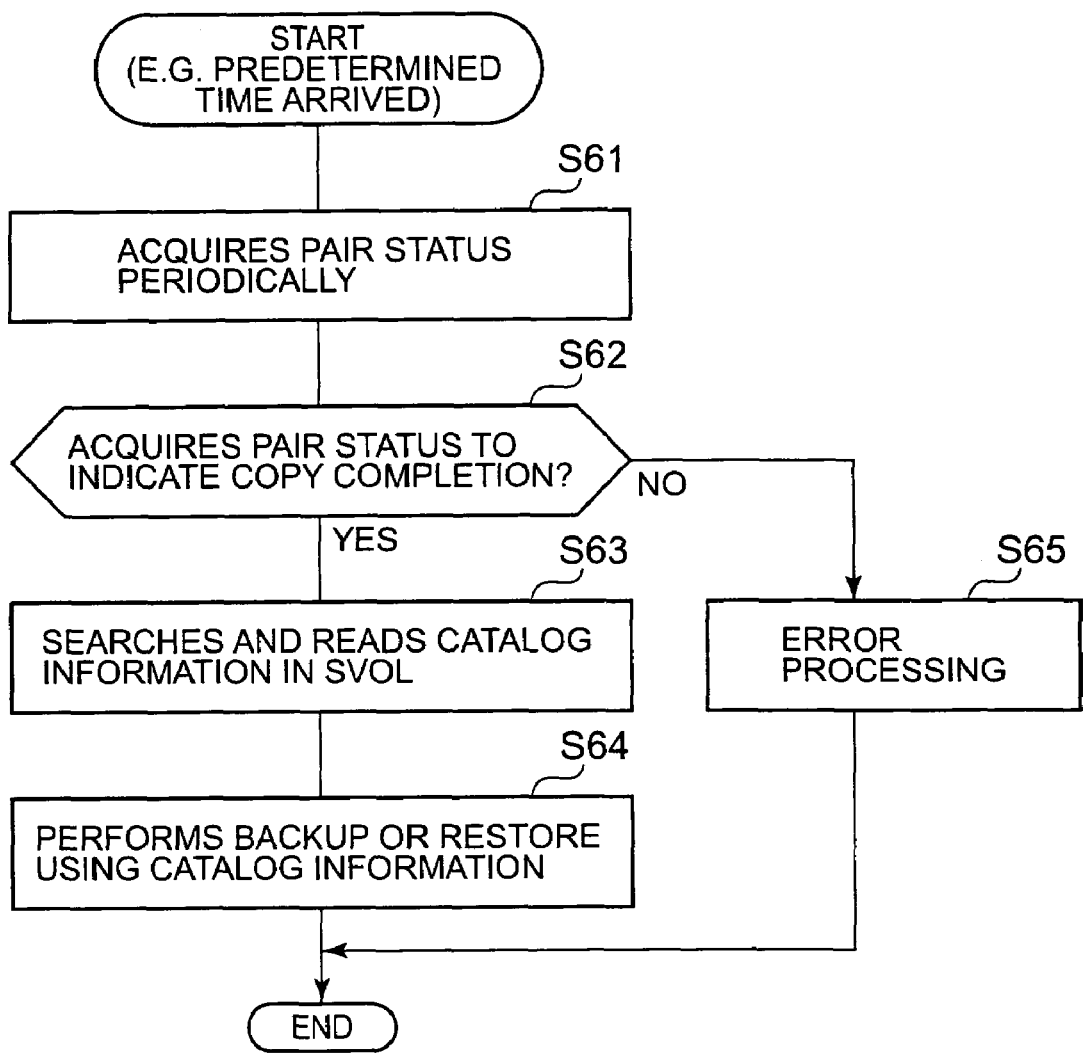
FIG. 8 is a flow chart depicting an example of processing executed by the second server 11 in the second embodiment of the present invention.

FIG. 8 shows an example of the processing flow executed by the second server 11 according to the second embodiment of the present invention.

The second storage backup program 14 performs processing the same as step S21 (S61). If a pair status to indicate copy completion is not acquired after a certain time has elapsed since the above mentioned predetermined time, or if a pair status to indicate copy failure is acquired (NO in S62), then the second storage backup program 14 executes a predetermined error processing (S65).

If the second storage backup program 14 acquired the pair status to indicate copy completion (YES in S62), on the other hand, the second storage backup program 14 searches and reads the catalog information from SVOL 145 (S63), and performs backup or restore using the read catalog information (S64). Here a predetermined file name has been set in the catalog information by the above mentioned processing, and the second storage backup program 14 can find the catalog information by searching the predetermined file name.

According to the second embodiment of the present invention, just like the first embodiment, the catalog information sent from the first server 1 can be provided to the second server 11 via the first command device 43 and second command device 143. By this, the catalog information held by the first server 1 can be provided to the second server 11, even if the first server 1 and second server 11 are not communicably connected.

Also according to the second embodiment, the command device is unnecessary.

Embodiment 3

Figure 9A:
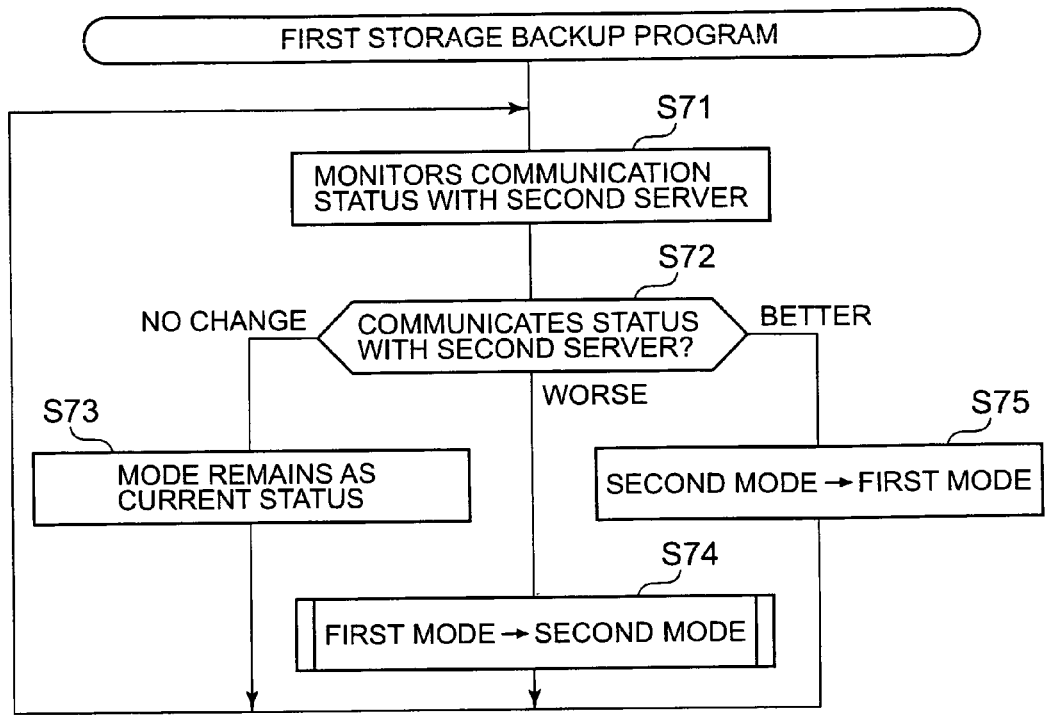
FIG. 9A is a flow chart depicting an example of processing executed in a third embodiment of the present invention.

FIG. 9A shows an example of the processing flow executed according to the third embodiment of the present invention.

In the third embodiment, the first storage backup program 4 selectively executes a first mode for sending the catalog information to the second server 11 via the fourth communication medium 12D, and a second mode for sending the catalog information to the second server 11 via the first and second storage systems 21 and 121.

The first storage backup program 4 periodically monitors the communication status with the second server 11 (S71).

The first storage backup program 4 keeps the mode in current status if the communication status is virtually the same as the previous monitoring result (S73). For example, if the current mode is the first mode, the first mode continues, and if the current mode is the second mode, the second mode continues. If the second mode continues, the first storage backup program 4 may perform the processing in FIG. 9B.

If the communication worsens (e.g. the transfer speed of the fourth communication medium 12D becomes a predetermined value or less, or it was detected that connection with the second server 11 was cut off), and the current mode is the first mode, then the first storage backup program 4 can switch the first mode to the second mode (S74). In other words, the first storage backup program 4 sets the mode such that the catalog information is sent to the first storage system 21, and the catalog information is not sent via the fourth communication medium 12D.

If the communication status improves (e.g. the transfer speed of the fourth communication medium 12D became faster than a predetermined value, or it was detected that the connection with the second server 11 recovered), and the current mode is the second mode, the first storage backup program 4 can switch the second mode to the first mode (S75). In other words, the first storage backup program 4 sets the mode such that the catalog information is sent via the fourth communication medium 12D, and the catalog information is not sent to the first storage system 21.

Figure 9B:
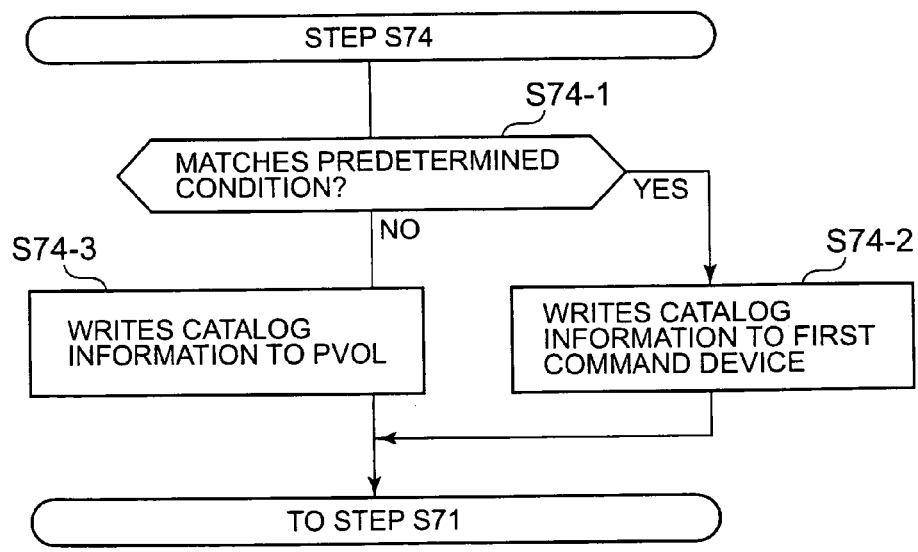
FIG. 9B is a flow chart depicting an example of processing executed in step S74.

FIG. 9B shows an example of the specific flow of the processing executed in step S74.

If matched with a predetermined condition (YES in S74-1), the first storage backup program 4 writes the catalog information to the first command device 43 via the first copy control program 6 (S74-2), and if not matched with a predetermined condition and matched with another condition (NO in S74-1), the first storage backup program 4 writes the catalog information to PVOL 45 (S74-3). For the predetermined condition, a condition where the open capacity of PVOL 45 is a predetermined value or less, for example, may be used. For another condition, a condition where the open capacity of PVOL 45 is more than a predetermined value, for example, may be used.

According to the third embodiment, the first storage backup program 4 can select either sending the catalog information via the fourth communication medium 12D, or sending the catalog information via the first storage system 21. The first storage backup program 4 can select either sending the catalog information via the first command device 43 or sending the catalog information via the PVOL 45.

Some preferred embodiments of the present invention were described above, but these are example to describe the present invention, and these shall not be intended to limit the scope of the present invention only to these embodiments. The present invention can be embodied in various other ways. For example, each of the above embodiments can be applied not only to catalog information, but also to notifying other kinds of information.

What is claimed is:

1. A computer system comprising:
    a first computer;
    a first storage system coupled to said first computer;
    a second storage system coupled to said first storage system; and
    a second computer coupled to said second storage system,
    wherein said first storage system includes a first controller and a plurality of first logical volumes accessed from said first controller, wherein said second storage system includes a second controller and a plurality of second logical volumes accessed from said second controller, wherein said plurality of first logical volumes include:
one or more primary data volumes which are primary logical volumes storing data to be referred to via said first controller by said first computer; and
a first command device which is a logical volume capable of storing a command for said first controller, wherein said plurality of second logical volumes include:
each secondary data volume which is each secondary logical volume forming a pair with each primary data volume; and
a secondary command device, which is a logical volume capable of storing a command for said second controller, wherein said primary command device is provided with a first management table for recording pair information to indicate which primary data volume and which secondary data volume form a pair, wherein said second command device is provided with a second management table for recording pair information to indicate which primary data volume and which secondary data volume form a pair, wherein said first controller stores command device management information regarding said first command device and said second command device forming a pair with said first command device, wherein said first computer includes:
a first backup unit for controlling backup of data;
an access unit for reading data from said primary data volume and writing data to said primary data volume; and
a first copy control unit for controlling data copy from the primary data volume to the secondary data volume, wherein said second computer includes:
a second backup unit for controlling backup of data; and
a second copy control unit for controlling data copy from the primary data volume to the secondary data volume, wherein said first backup unit performs:
(a) staticizing said access unit so that said access unit does not write data to a certain primary data volume;
(b) preparing catalog information which is information including information on the time when said staticizing is performed, information on a pair of said certain primary data volume and said certain secondary data volume and information on said access unit; and
(c) sending instruction to write said prepared catalog information to said first management table and to copy the data in said certain primary data volume, to said first copy control unit, wherein in response to the instruction, said first copy control unit writes a catalog write instruction to write said prepared catalog information in said first management table and a volume copy instruction to copy data in said certain primary data volume in a certain secondary data volume, to said first command device, wherein said first controller, in response to said catalog write instruction stored in said first command device, writes said catalog information to said first management table, wherein said first controller, in response to said volume copy instruction stored in said first command device, performs the following processes (A) and (B) concurrently:

(A) sending a write instruction which is an instruction to write catalog information written on said first management table and indicates said second command device recognized from said catalog command management information, to said second controller; and
(B) sending data groups from said certain primary data volume to said second controller, wherein said second controller, in response to a write instruction from said first controller, writes catalog information to said second management table, writes the data group from said first controller to said certain secondary data volume, wherein said second copy control unit receives said catalog information from said second management table and transfers said received catalog information to said second backup unit, wherein said second backup unit, by using catalog information from said second copy control unit, performs backup or recovery of a data group in said certain secondary data volume, wherein said catalog information is information for said second backup unit to perform backup or recovery, and is information for guaranteeing the consistency of the data used by said first backup unit.

2. A computer system according to claim 1, wherein:
said first computer is coupled to said second compute, and said first backup unit performs processes (d) to (f):
(d) monitoring communication status with said second computer;
(e) if the communication worsens, determining to send said catalog Information to said second computer via said first and second storage systems; and
(f) if the communication status improves, determining to send said catalog information to said second computer not via said first and second storage systems.

3. A computer system according to claim 2, wherein said first backup unit performs the following processes (g) to (i):
(g) staticizing said access unit so that said access unit does not write data to a certain primary data volume;
(h) preparing catalog information which includes information on the time when said staticizing is performed, information on a pair of said certain primary data volume and said certain secondary data volume, and information on said access unit, converts said prepared catalog information into an electronic file having a predetermined file name; and
(i) sending an instruction to write said electronic file to said certain primary data volume, and thereafter to copy the data in said certain primary data volume, to said first copy control unit, wherein said first copy control unit sends, a volume copy instruction to copy data in said certain primary data volume to said certain secondary data volume, to said first controller, wherein said first controller, in response to said volume copy instruction, sends a data group including said electronic file in said certain primary data volume to said second controller, wherein said second controller writes said data group from said first controller to said certain secondary data volume, wherein said second backup unit, acquires catalog information, which is said electronic file, from said certain secondary data volume by searching said predetermined file name in said certain secondary data volume, and performs backup or recovery of data group in said certain secondary data volume using said acquired catalog information, wherein in said step (e), said first backup unit, if the communication worsens, when matched with a first condition, determines to send said catalog information to said second computer via said first and second command devices, and when matched with a second condition, determines to send said catalog information to said second computer via said first primary data volume and said secondary data volume.

4. A computer system according to claim 3, wherein:
said first condition is that open capacity of said primary data volume is less than a predetermined value, and
said second condition is that open capacity of said primary data volume is more than a predetermined value.

5. A computer system according to claim 1, wherein said first backup unit performs the following processes (d) to (f):
   (d) staticizing said access unit so that said access unit does not write data to a certain primary data volume;
   (e) preparing catalog information which includes information on the time when said staticizing is performed, information on a pair of said certain primary data volume and said certain secondary data volume, and information on said access unit, converts said prepared catalog information into an electronic file having a predetermined file name; and
   (f) sending an instruction to write said electronic file to said certain primary data volume, and thereafter to copy the data in said certain primary data volume, to said first copy control unit,
wherein said first copy control unit sends, a volume copy instruction to copy data in said certain primary data volume to said certain secondary data volume, to said first controller,
wherein said first controller, in response to said volume copy instruction, sends a data group including said electronic file in said certain primary data volume to said second controller,
wherein said second controller writes said data group from said first controller to said certain secondary data volume,
wherein said second backup unit, acquires catalog information, which is said electronic file, from said certain secondary data volume by searching said predetermined file name in said certain secondary data volume, and performs backup or recovery of data group in said certain secondary data volume using said acquired catalog information, and
said first backup unit, when matched with a first condition, determines to send said catalog information to said second computer via said first and second command devices, and when matched with a second condition, determines to send said catalog information to said second computer via said first primary data volume and said secondary data volume.

6. A computer system comprising:
a first computer;
a first storage system coupled to said first computer;
a second storage system coupled to said first storage system; and
a second computer coupled to said second storage system,
wherein said first storage system includes a first controller and a plurality of first logical volumes accessed from said first controller,
wherein said second storage system includes a second controller and a plurality of second logical volumes accessed from said second controller,
wherein said plurality of first logical volumes include one or more primary data volumes which are primary logical volumes storing data to be referred to via said first controller by said first computer,
wherein said plurality of second logical volumes include each secondary data volume which is each secondary logical volume forming a pair with each primary data volume,
wherein said first computer includes:
   a first backup unit for controlling backup of data;
   an access unit for reading data from said primary data volume and writing data to said primary data volume; and
   a first copy control unit for controlling data copy from the primary data volume to the secondary data volume,
wherein said second computer includes:
   a second backup unit for controlling backup of data; and
   a second copy control unit for controlling data copy from the primary data volume to the secondary data volume,
wherein said first backup unit performs the following processes (a) to (c):
   (a) staticizing said access unit so that said access unit does not write data to a certain primary data volume;
   (b) preparing catalog information which includes information on the time when said staticizing is performed, information on a pair of said certain primary data volume and said certain secondary data volume, and information on said access unit, converts said prepared catalog information into an electronic file having a predetermined file name; and
   (c) sending an instruction to write said electronic file to said certain primary data volume, and thereafter to copy the data in said certain primary data volume, to said first copy control unit,
wherein said first copy control unit sends, a volume copy instruction to copy data in said certain primary data volume to said certain secondary data volume, to said first controller,
said first controller, in response to said volume copy instruction, sends a data group including said electronic file in said certain primary data volume to said second controller,
wherein said second controller writes said data group from said first controller to said certain secondary data volume,
wherein said second backup unit, acquires catalog information, which is said electronic file, from said certain secondary data volume by searching said predetermined file name in said certain secondary data volume, and performs backup or recovery of data group in said certain secondary data volume using said acquired catalog information,
wherein said catalog information is information for said second backup unit to perform backup or recovery, and is information for guaranteeing the consistency of the data used by said first backup unit.

7. A computer system according to claim 6, wherein:
said first computer is coupled to said second computer,
said first backup unit performs processes (d) to (e):
   (d) monitoring communication status with said second computer;
   (e) if the communication worsens, determining to send said catalog Information to said second computer via said first and second storage systems; and
   (f) if the communication status improves, determining to send said catalog information to said second computer not via said first and second storage systems.

* * * * *